United States Patent
Shiraki et al.

(10) Patent No.: US 8,303,903 B2
(45) Date of Patent: Nov. 6, 2012

(54) APPARATUS FOR CARBON NANOTUBE SYNTHESIS

(75) Inventors: Shuichi Shiraki, Tokyo (JP); Takeji Murai, Makinohara (JP); Yuzo Nakagawa, Tokyo (JP)

(73) Assignee: Nikkiso Co., Ltd., Tokyo (JP)

( * ) Notice: Subject to any disclaimer, the term of this patent is extended or adjusted under 35 U.S.C. 154(b) by 181 days.

(21) Appl. No.: 12/740,454

(22) PCT Filed: Nov. 11, 2008

(86) PCT No.: PCT/JP2008/070506
§ 371 (c)(1),
(2), (4) Date: Apr. 29, 2010

(87) PCT Pub. No.: WO2009/096077
PCT Pub. Date: Aug. 6, 2009

(65) Prior Publication Data
US 2010/0260650 A1    Oct. 14, 2010

(30) Foreign Application Priority Data
Jan. 31, 2008    (JP) .................................. 2008-020968

(51) Int. Cl.
*B01J 19/00* (2006.01)
*F28D 7/00* (2006.01)
*C01B 31/00* (2006.01)
*C01B 31/02* (2006.01)

(52) U.S. Cl. ..... 422/198; 422/129; 422/200; 423/445 R; 423/445 B

(58) Field of Classification Search .................. 422/129, 422/187, 198, 200; 977/734, 742, 750, 752, 977/840, 842; 423/445 R, 445 B
See application file for complete search history.

(56) References Cited

U.S. PATENT DOCUMENTS
3,497,674 A * 2/1970 Zirngibl et al. ............... 392/466
6,790,426 B1   9/2004 Ohsaki FOREIGN PATENT DOCUMENTS
JP     09324325 A  * 12/1997
JP     2001-80913 A   3/2001
JP     2001-115348 A  4/2001
(Continued)

OTHER PUBLICATIONS

Machine translation of JP 2005-041752 A, published on Feb. 17, 2005.*
International Preliminary Report on Patentability for International Application No. PCT/JP2008/070506.
International Search Report and Written Opinion in International Application No. PCT/JP2008/070506 mailed Feb. 3, 2009.

(Continued)

*Primary Examiner* — Walter D Griffin
*Assistant Examiner* — Natasha Young
(74) *Attorney, Agent, or Firm* — McCarter & English, LLP

(57) ABSTRACT

A production amount and a yield in a carbon nanotube producing device are improved. Inside a reaction pipe (20) heated so as to become a circumference heating body, a plurality of nozzles (26) for injecting a material and carrier gas into the reactor pipe and at least one internal heating source (24) are arranged. By arranging a plurality of the nozzles, the production amount is increased. The nozzles are arranged so as to be sandwiched by two heating sources (circumference heating element, internal heating source) and a distance to the closest two heating source peripheral walls is "a". Also, a distance between the adjacent nozzles is "b" ($\geq 2a$). Flows of the material and the carrier gas injected by the nozzles do not interfere with each other or the heating source wall, and the yield is increased.

6 Claims, 6 Drawing Sheets

FOREIGN PATENT DOCUMENTS

| | | | | |
|---|---|---|---|---|
| JP | 2003138432 | A | * | 5/2003 |
| JP | 2003-201630 | A | | 7/2003 |
| JP | 2004-353257 | A | | 12/2004 |
| JP | 2005-41752 | A | | 2/2005 |

OTHER PUBLICATIONS

Supplementary European Search Report for European Application No. EP 08 87 1754, dated Apr. 5, 2012.

* cited by examiner

APPARATUS FOR CARBON NANOTUBE SYNTHESIS

CROSS-REFERENCE TO RELATED APPLICATIONS

This application is the U.S. National Phase of International Application No. PCT/JP2008/0700506, entitled "Carbon Nanotube Synthesizer," filed Nov. 11, 2008, and claims priority to Japanese Patent Application No. 2008-020968 filed Jan. 31, 2008, the disclosures each of which are hereby incorporated by reference in their entirety.

BACKGROUND OF THE INVENTION

The present invention relates to a structure of a device for carbon nanotubes synthesis.

BACKGROUND OF THE RELATED ART

As a method for synthesizing carbon nanotubes, a vapor-phase flow method is known. In this method, a material containing a carbon source, a catalyst and the like is supplied into a heated cylindrical reactor pipe, and carbon nanotubes are made to grow in a state floating in the reactor pipe. The carbon nanotube has attracted attention recently as a new material having new possibilities, and industrial uses thereof have been examined. For industrial use, increase of a production amount is in demand.

Patent Document 1 discloses a technique for increasing a yield by enlarging a diameter of a lab level reactor pipe and by increasing the number of source gas ejection holes. In that case, in order to eliminate unevenness in temperature inside the reactor pipe, an internal heating source is arranged inside the reactor pipe.

Patent Document 1: Japanese Patent Laid-Open Publication No. 2005-41752

BRIEF SUMMARY OF THE INVENTION

In the production of carbon nanotubes, in addition to the production amount, there is a demand for improved yield, that is, an increase of a ratio of the carbon nanotubes having a desired structure. If single walled carbon nanotubes are to be obtained, for example, deposition of multiwalled carbon nanotubes, amorphous carbons and the like should be suppressed. It is an advantage of the present invention to provide a synthesizer with higher production amount and yield.

A carbon nanotube synthesizer of the present invention includes a cylindrical reactor pipe heated by a heating device so as to be a cylindrical heating element, a tubular or columnar internal heating source arranged inside the reactor pipe so as to have an axis parallel with the axis of the reactor pipe, and a plurality of material injection nozzles for supplying a material and a carrier gas into the reactor pipe along a direction parallel with the axis of the reactor pipe. The carrier gas is supplied so as to surround the periphery of the injected material. The nozzles are arranged so that a distance between one of the nozzles and two heating bodies (the circumference heating element or the internal heating source) closest to this nozzle is a first distance, and a distance from this nozzle to a nozzle closest to this nozzle is a second distance, which is twice or more of the first distance.

According to the present invention, a yield of the carbon nanotube synthesizer can be improved.

DETAILED DESCRIPTION OF THE INVENTION

Figure 1:
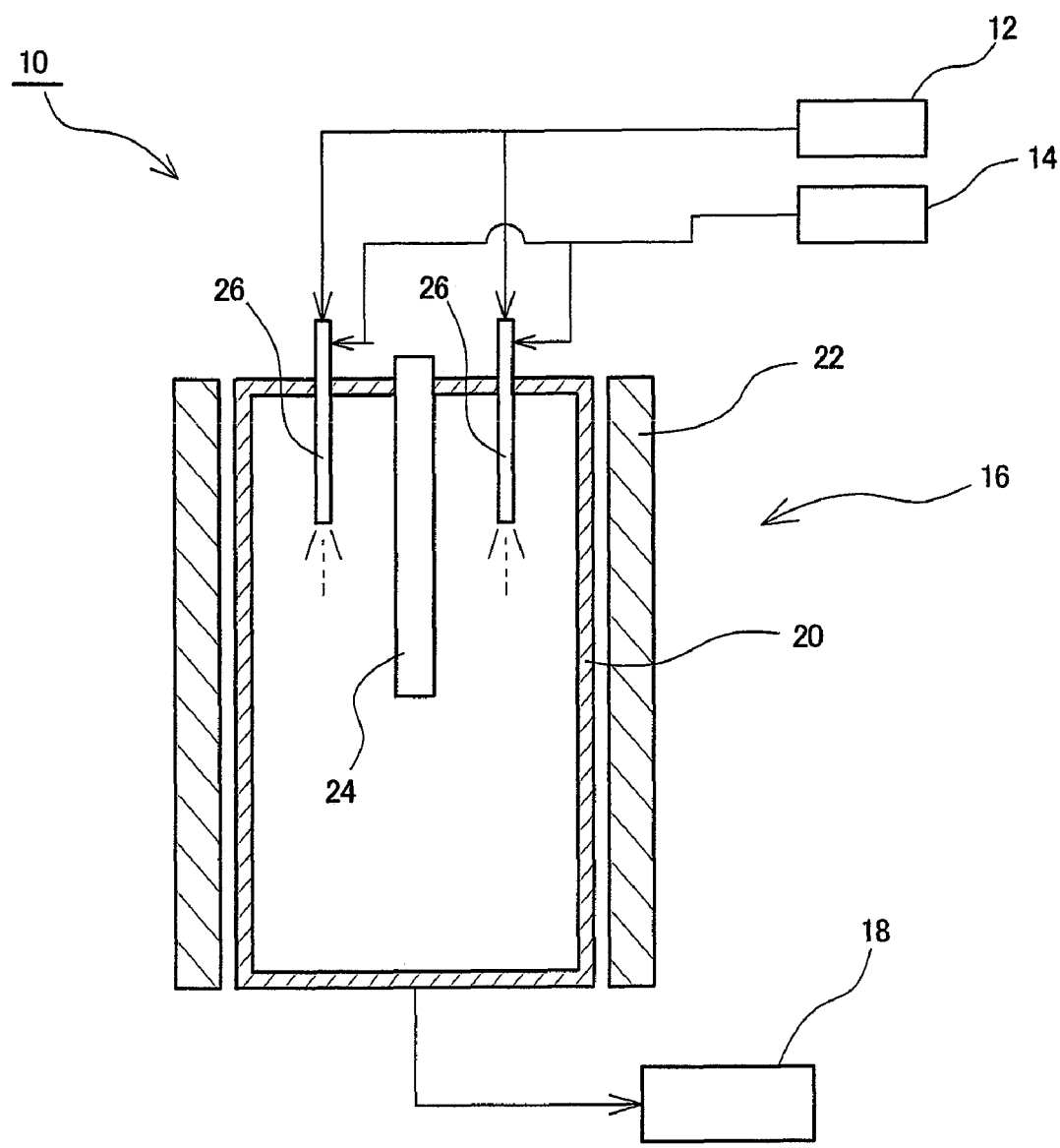
FIG. 1 is a diagram illustrating an outline configuration of a carbon nanotube producing device of this embodiment.

An embodiment of the present invention will be described below referring to the attached drawings. FIG. 1 is an outline configuration diagram of a carbon nanotube producing device 10. The carbon nanotube producing device 10 includes a material supplying device 12 for supplying a material, a carrier gas supplying device 14 for supplying a carrier gas, a synthesizer 16 for synthesizing carbon nanotubes from the material, and a collecting device 18 for collecting the synthesized carbon nanotubes. The material includes a carbon source, a catalyst, and auxiliaries. The carrier gas does not directly relate to synthesis of the carbon nanotubes but is used for adjusting a material reaction condition inside the synthesizer 16.

The synthesizer 16 includes a substantially cylindrical reactor pipe 20 and a heating device 22 arranged so as to surround the reactor pipe 20. The reactor pipe 20 is arranged so that its cylindrical axis is along the vertical direction, that is, a direction in which gravity acts. Here, the concept of "gravity" includes pseudo gravity caused by an inertial force such as a centrifugal force in addition to the intermoleculer force. The reactor pipe 20 is heated by the heating device 22 so as to have a high temperature and to become a circumference heating element heating the inside wall of the pipe. In the reactor pipe 20, an internal heating source 24 is further arranged. The internal heating source 24 has a tubular, columnar, or preferably circular tubular or circular cylinder shape, and is arranged so that its axis is parallel to the cylindrical axis of the reactor pipe 20. In this embodiment, a circular cylinder shape is employed. The concept of "parallelism" in this case also includes a coaxial arrangement of the reactor pipe 20 and the internal heating source 24. The internal heating source is arranged in single or in plural, and the arrangement will be described later. As the heating device 22 and the internal heating source 24, for example, a heating element using an electric resistance can be used.

In the reactor pipe 20, a plurality of nozzles 26 for supplying the material and the carrier gas are arranged. The material has a transition metal compound to be a catalyst and a reaction auxiliary added to a solvent containing a carbon source with prior adjustment, and is supplied by the material supplying device 12 to the nozzles 26 through a pump. Moreover, the material is injected into the reactor pipe 20 as fine droplet particles from a distal end of the nozzle 26. The carrier gas is supplied by the carrier gas supplying device 14 into the reactor pipe 20 from the vicinity of the nozzles 26 while an appropriate flow rate is controlled by a mass flow meter. A distal end portion of the nozzle 26 is configured to supply the material and the carrier gas separately into the reactor pipe. The material is injected from the center of the distal end of the nozzle 26, while the carrier gas is supplied from the peripheral part of the distal end, and a resulting ring-shaped flow with a sectional shape surrounding the material droplet flows through the reactor pipe.

The material droplets receive heat from the circumference heating element and the internal heating source while flowing down through the reactor pipe 20, and carbon nanotubes are synthesized by actions of carbon generated by thermal decomposition of the carbon source, metal particles generated by thermal decomposition of the transition metal compound, and the auxiliary. From a bottom portion of the reactor pipe 20, a discharged gas containing the synthesized carbon nanotubes is discharged and fed to the collecting device 18. At the collecting device 18, the carbon nanotubes are separated from the discharged gas and collected.

Figure 2:
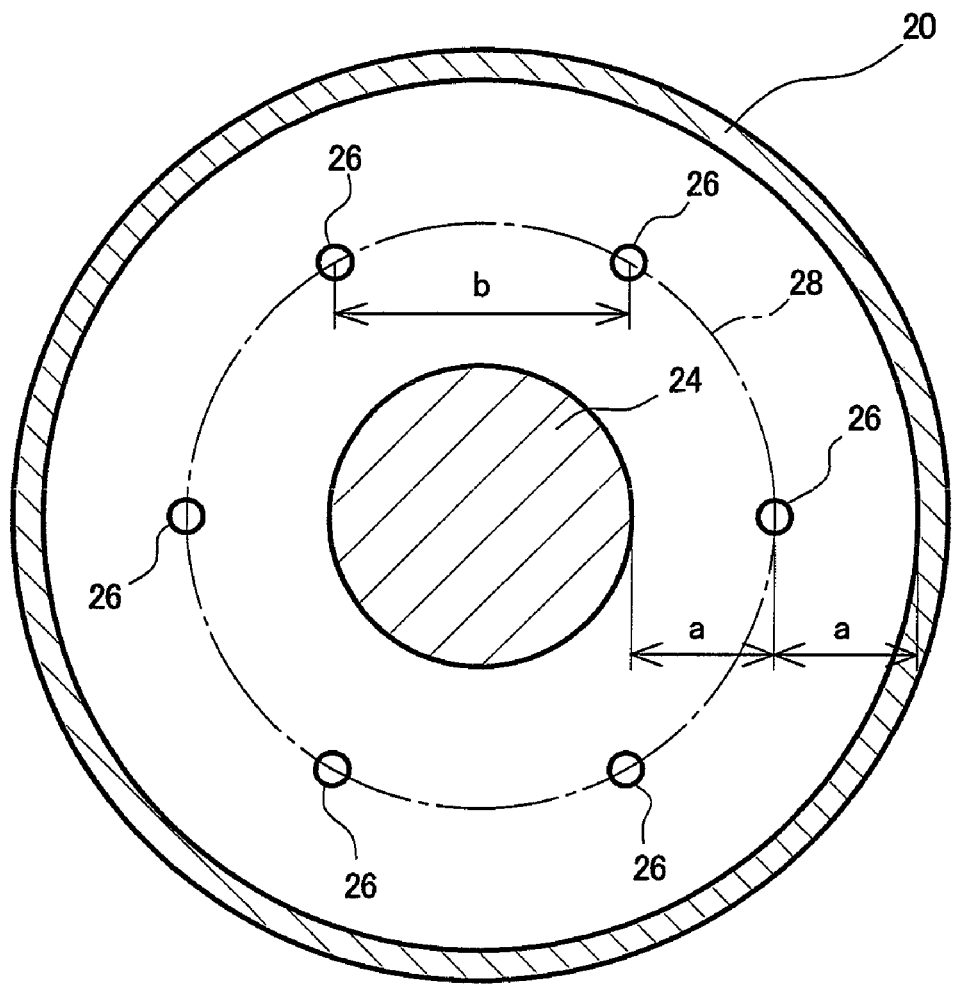
FIG. 2 is a diagram illustrating an arrangement example of the nozzles and an internal heating source.

Subsequently, arrangement of the internal heating sources 24 and the nozzles 26 will be described. In each of the following arrangement examples, arrangement in a section orthogonal to the axis of the reactor pipe 20 is shown. FIG. 2 is a transverse cross section of the synthesizer 16 in FIG. 1. An example of a single unit of the internal heating source 24 and 6 units of the nozzles 26 is shown. The internal heating source 24 is arranged coaxially with the reactor pipe 20, which is a circumference heating element. The nozzles 26 are arranged on a circle 28 at an equal distance a from an inner wall of the reactor pipe 20 and a peripheral surface of the internal heating source 24. Moreover, the nozzles 26 are arranged so that a distance between the adjacent nozzles is a distance b, which is approximately twice the distance a. The distance a is a distance between the nozzle and the reactor pipe inner wall surface acquired from the synthesizer in which a single nozzle is disposed at the center of a reactor pipe so that synthesis of high yield and high quality carbon nanotubes is to be realized. The arrangement of the internal heating source and the nozzle is considered so that at least two heating bodies (the reactor pipe and the internal heating source) at this distance a are provided for one nozzle, or more preferably, the arrangement in which the nozzle is sandwiched by two heating sources is considered. There are cases in which the two heating sources are the reactor pipe and a single unit of the internal heating source, and the two heating sources are the reactor pipe and two internal heating sources. Also, the distance a is considered to be a distance with which flows of the material and the carrier gas supplied from the adjacent nozzles 26 do not interfere with the reactor pipe inner wall. In the example in FIG. 2, by increasing the distance b to approximately twice the distance a, the flows of the material and the carrier gas injected from the adjacent nozzles can be prevented from interfering with each other. From the viewpoint that the flows are prevented from interfering with each other, it is understood that the distance b is preferably twice or more the distance a. The greater the number of arranged nozzles, the more the yield can be increased, and from this viewpoint, the shorter distance b is the better, and the distance b is preferably set at twice the distance a. In order to achieve the distance b of twice the distance a, a diameter of the internal heating source 24 is adjusted.

Figure 3:
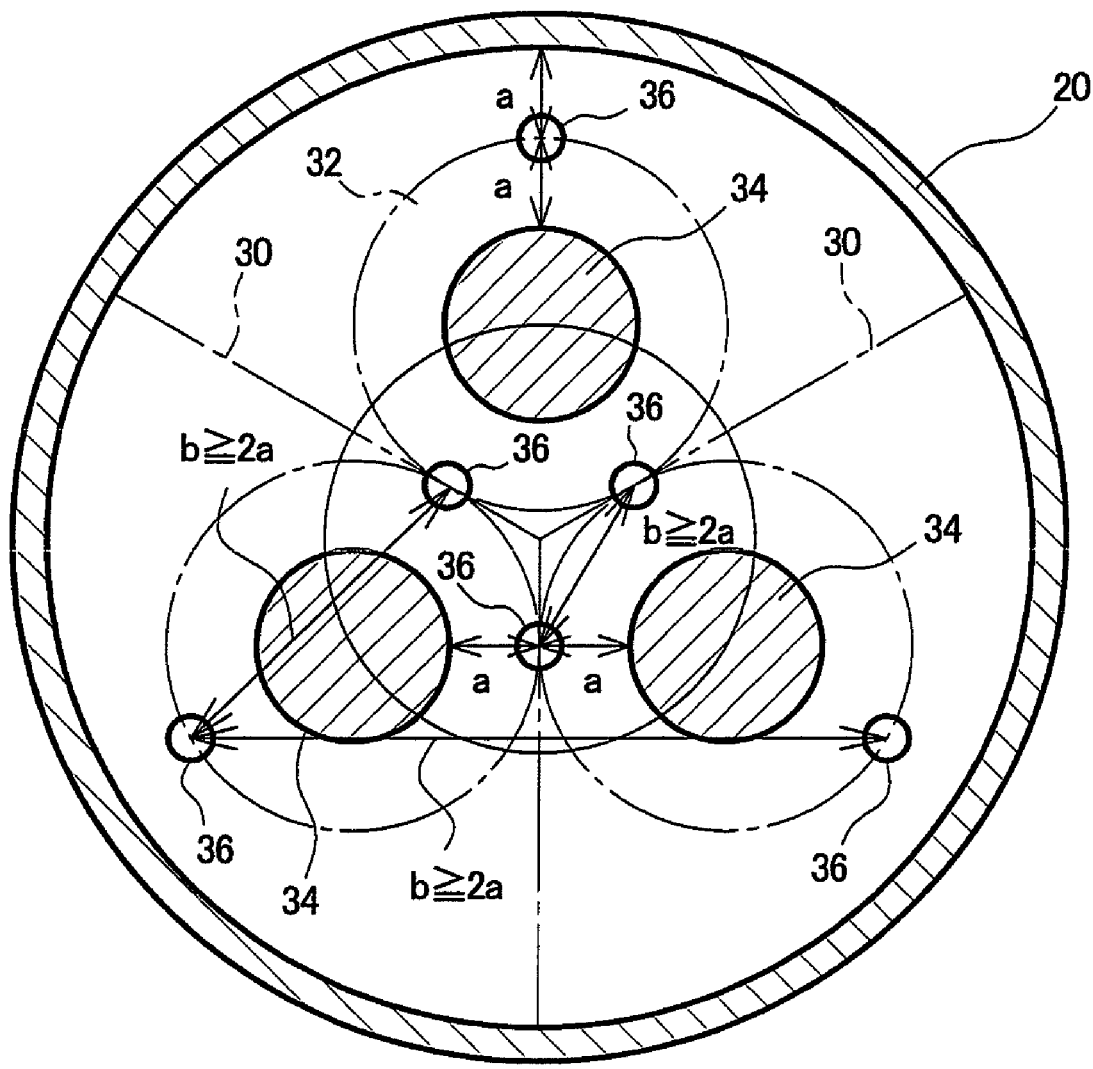
FIG. 3 is a diagram illustrating an arrangement example of the nozzles and the internal heating sources.

FIG. 3 is a diagram illustrating another arrangement example of the internal heating sources and nozzles. There are arranged three units of an internal heating sources 34 and six units of a nozzles 36. A circle formed by the inner wall of the reactor pipe 20 is divided into three sectors. At the center of a circle 32 inscribed in radiuses 30 of both ends of the sector, the center of the internal heating source 34 is arranged. A distance between the circle 32 and the internal heating source 34 is made a, and the circle 32 passes through a midpoint between the peripheral wall of the internal heating source 34 and the inner wall of the reactor pipe 20. The nozzles 36 are arranged at contacts between the circles 32, and a diameter of the internal heating source 34 is determined so that the distance b between the nozzles is twice or more the distance a, and the shortest distance between the peripheral wall of the internal heating source 34 and the internal wall of the reactor pipe 20 is 2a. From another viewpoint, the arrangement in FIG. 3 is as follows. The three internal heating sources 34 are arranged on a single circumference concentric to the reactor pipe 20. For one internal heating source 34, one nozzle 36 is arranged between that and the reactor pipe 20, and one nozzle each corresponds to each of the three internal heating source. Also, between the adjacent internal heating sources 34, one nozzle 36 is arranged, and the three nozzles in total are arranged.

Figure 4:
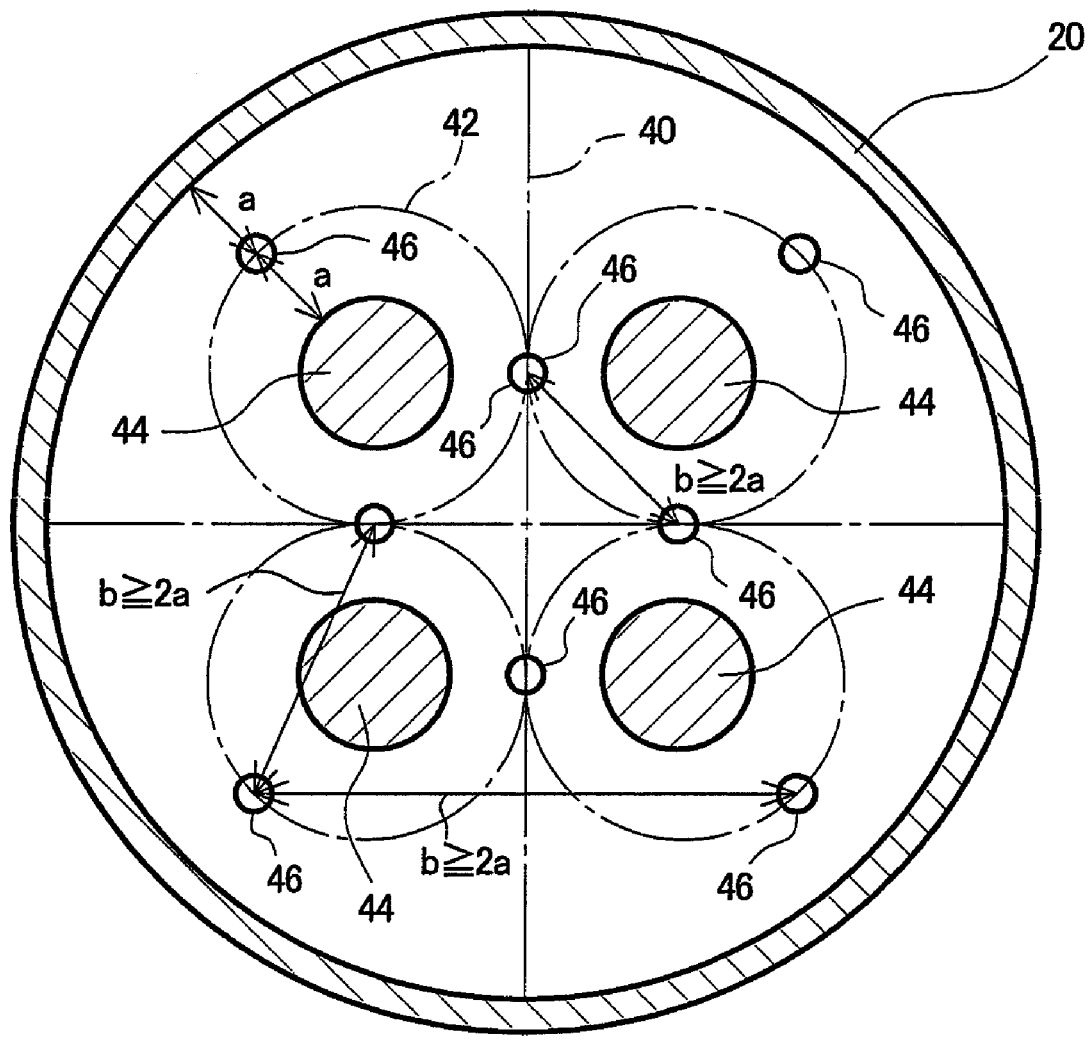
FIG. 4 is a diagram illustrating an arrangement example of the nozzles and the internal heating sources.

FIG. 4 is a diagram illustrating still another arrangement example of the internal heating sources and the nozzles. There are arranged four units of internal heating sources 44 and eight units of the nozzles 46. The arranging method is basically the same as in FIG. 3. In FIG. 3, the circle formed by the inner wall of the reactor pipe 20 is equally divided into three parts, but in the example in FIG. 4, it is equally divided into four parts. Then, the internal heating source 44 is arranged so that its center is located at the center of a circle 42 inscribed in radiuses 40 of both ends of the sector. A distance between the circle 42 and the internal heating source 44 is made a, and the circle 42 passes through the midpoint between the peripheral wall of the internal heating source 44 and the inner wall of the reactor pipe 20. A diameter of the internal heating source 44 is determined so that the nozzle 46 is arranged at a contact between the circles 42, the distance b between the nozzles is twice or more the distance a, and the shortest distance between the peripheral wall of the internal heating source 44 and the inner wall of the reactor pipe 20 is 2a. Similarly, the number of the internal heating sources 44 can be increased. From another viewpoint, the arrangement in FIG. 4 is as follows. The four internal heating sources 44 are arranged on a single circumference concentric to the reactor pipe 20. For one internal heating source 44, one nozzle 46 is arranged between that and the reactor pipe 20, and one nozzle each corresponds to each of the four internal heating sources. Also, between the adjacent internal heating sources 44, one nozzle 46 is arranged, and the four nozzles in total are arranged.

Figure 5:
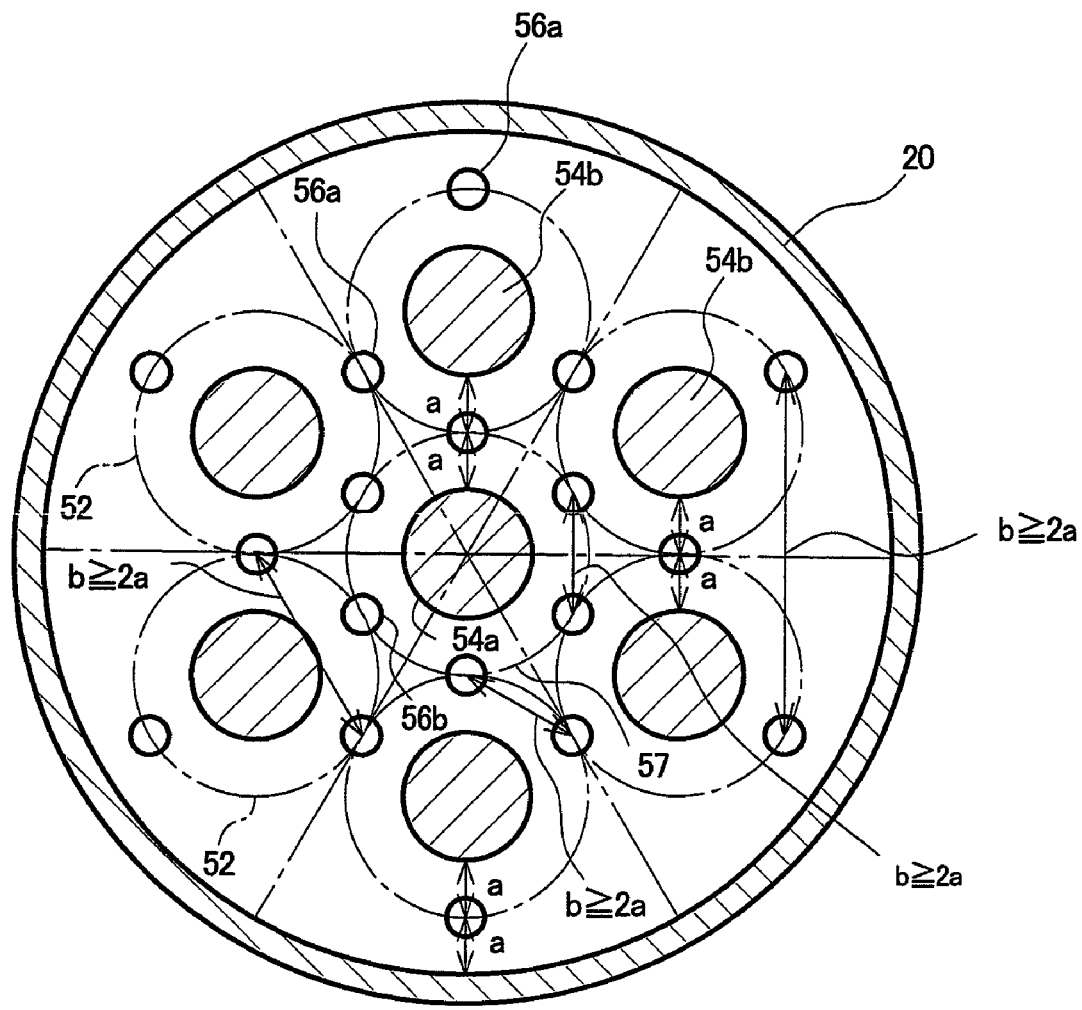
FIG. 5 is a diagram illustrating an arrangement example of the nozzles and the internal heating sources and FIG. 6 is a diagram illustrating an arrangement example of the nozzles and the internal heating source.

The arrangement examples shown in FIGS. 3 and 4 are examples in which a plurality of internal heating sources 34 or 44 are arranged on a single circumference, but if the number of the internal heating sources is increased, more locations of the internal heating sources can be arranged inside accordingly. FIG. 5 is an example in which six units of the internal heating source 54b are arranged on a single circumference and moreover, an another internal heating source 54a is arranged inside them. Arrangement of the six internal heating source 54b and nozzles 56a can be determined similarly to the arrangement examples in FIGS. 3 and 4. With the same center as that of the reactor pipe 20, a circle 57 inscribed in a circle 52 is determined. A diameter of the internal heating source 54b can be determined so that a distance between the circle 57 and the peripheral wall becomes a. If there are six units of the internal heating sources 54b arranged on the single circumference, the diameters of the internal heating sources 54a and 54b become equal to each other. The nozzle 56b is also arranged at the point of contact between the circle 52 and the circle 57. From another viewpoint, the arrangement in FIG. 5 is as follows. The internal heating source 54a is arranged coaxially with the reactor pipe 20. The six internal heating sources 54b are arranged on a single circumference concentric to the reactor pipe 20. One nozzle each is arranged between each of the six internal heating sources 54b arranged on the circumference and the reactor pipe 20, that is, six nozzles in total are arranged, one nozzle each is arranged between each of the six internal heating source 54b and the internal heating source 54a at the center, that is, six nozzles in total are arranged, and moreover, one each is arranged between the adjacent internal heating source 54b arranged on the single circumference, that is, six nozzles in total are arranged.

Figure 6:
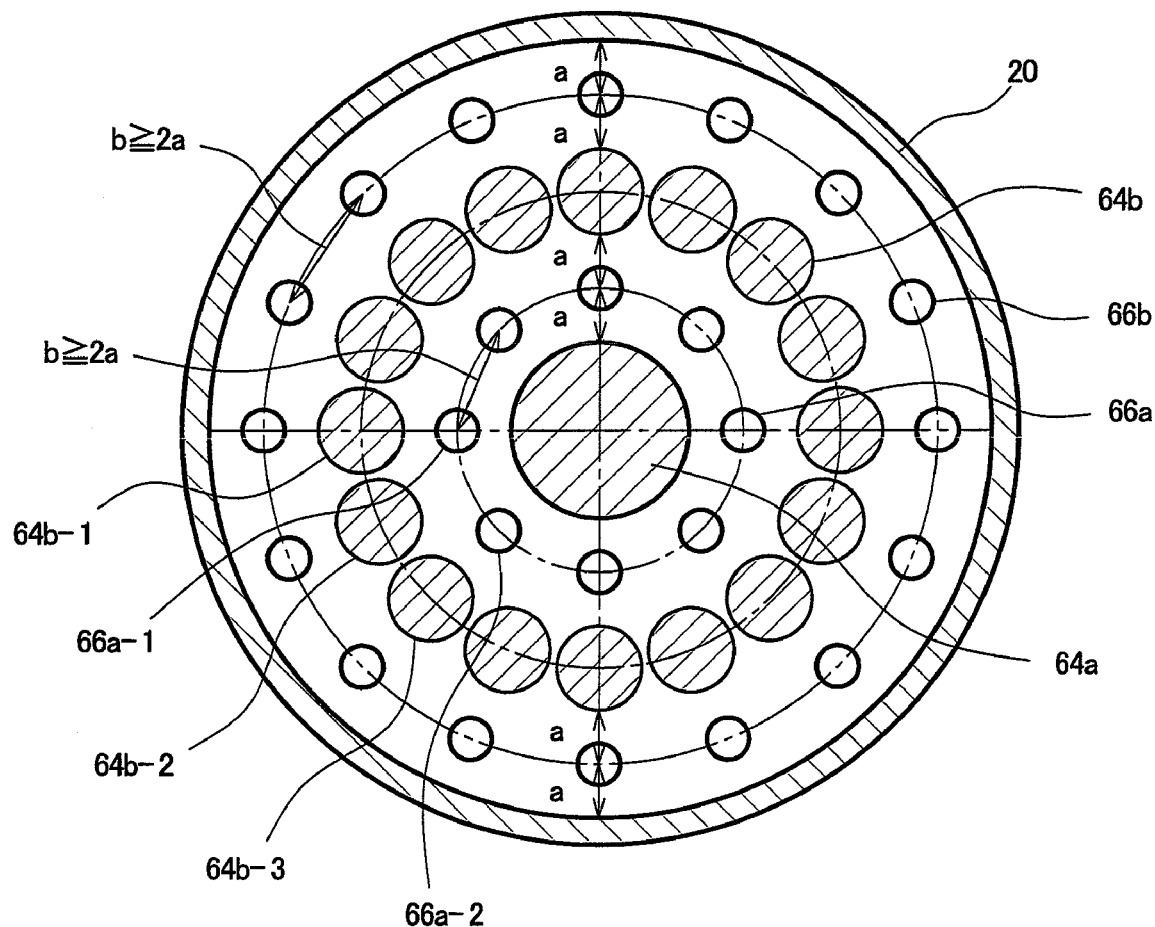

FIG. 6 is a diagram illustrating still another arrangement example of the internal heating sources and the nozzles. In this example, the internal heating sources 64a and 64b and the nozzles 66a and 66b are arranged alternately and concentrically. Also, the internal heating sources 64a and 64b and the nozzles 66a and 66b arranged on the same circumferences are arranged at equal intervals. The internal heating source 64a is arranged at the center of the reactor pipe 20, the nozzles 66a are arranged on the same circumference outside it, and the internal heating sources 64b further outside them and the nozzles 66b still further outside them are arranged on the respective same circumferences. A distance between each of the peripheral walls of the internal heating sources 64a and 64b is 2a, and the nozzles 66a are arranged at the midpoint. The number of nozzles 66a is half that of the internal heating sources 64b so that an interval b between the nozzles 66a is 2a or more. That is, a nozzle 66a-1 is arranged on a line connecting the center of an internal heating source 64b-1 (See FIG. 6) and the center of the internal heating source 64a. A nozzle 66a-2 is arranged on a line connecting an internal heating source 64b-3 skipping an internal heating source 64b-2 from the above internal heating source 64b-1 and the center of the internal heating source 64a. A diameter of the internal heating source 64a and the number of the internal heating sources 64b are determined so that the distance between the adjacent nozzles 66a is 2a or more.

Nozzle 66b on the outside are arranged in one to one correspondence with the internal heating sources 64b. A distance between an inner peripheral wall of the reactor pipe 20 and a peripheral wall of the internal heating source 64b on the outside is 2a, and the nozzle 66b is arranged at the midpoint. As for the nozzle 66b, too, the number of the internal heating sources 64b and diameters of the internal heating sources 64a and 64b are determined so that the distance b between the adjacent nozzles is 2a or more.

What is claimed is:

1. An apparatus for carbon nanotube synthesis, comprising:
    a cylindrical reactor pipe heated by a heating device so as to become a circumference heating element;
    at least one tubular or columnar internal heating sources arranged in said reactor pipe and having an axis parallel to an axis of said reactor pipe; and
    a plurality of nozzles for injecting a material and a carrier gas into the reactor pipe along a direction parallel to the axis of said reactor pipe, in which the carrier gas is supplied so as to surround the periphery of the supplied material, wherein
    a distance between said nozzle and two heating bodies, among the circumference heating element and the internal sources, that are closest to this nozzle is a first distance, and a distance from the nozzle to a nozzle closest to this nozzle is a second distance, which is twice or more said first distance.

2. The carbon nanotube synthesizer according to claim 1, wherein said reactor pipe and one unit of said internal heating source are arranged coaxially.

3. The carbon nanotube synthesizer according to claim 1, wherein a plurality of said internal heating sources are arranged on a single circumference concentric to said reactor pipe; and
    said nozzles are arranged one each between each of said internal heating sources and said reactor pipe and one each between said adjacent internal heating sources.

4. The carbon nanotube synthesizer according to claim 3, wherein the number of said internal heating sources is three.

5. The carbon nanotube synthesizer according to claim 3, wherein the number of said internal heating sources is four.

6. The carbon nanotube synthesizer according to claim 1, wherein one of said internal heating sources is arranged coaxially with said reactor pipe and six additional units of said internal heating sources are arranged on a single circumference concentric to said reactor pipe; and said nozzles are arranged one each between each of the internal heating sources arranged on said circumference and said reactor pipe, one each between the internal heating sources arranged coaxially with said reactor pipe, and one each between the adjacent heating sources arranged on said circumference.

* * * * *